United States Patent [19]

Halaka et al.

[11] Patent Number: 5,128,027
[45] Date of Patent: Jul. 7, 1992

[54] METHOD FOR REMOVING MINERAL SLIMES FROM KAOLIN CLAY

[76] Inventors: Naguib Halaka, 120 Raylan Dr., Sutter Creek, Calif. 95685; Joseph Iannicelli, 796 S. Beachview Dr., Jekyll Island, Ga. 31520

[21] Appl. No.: 533,135
[22] Filed: Jun. 7, 1990
[51] Int. Cl.$^5$ ............................................... B03B 1/04
[52] U.S. Cl. ..................................... 209/5; 423/118; 501/146
[58] Field of Search ................... 209/5; 423/118, 130, 423/264; 501/146

[56] References Cited

U.S. PATENT DOCUMENTS

| 3,371,988 | 3/1968 | Maynard et al. | 423/118 |
| 3,661,515 | 5/1972 | Iannicelli et al. | 501/146 |
| 3,857,781 | 12/1974 | Maynard | 209/5 |
| 4,018,673 | 4/1977 | Hughes et al. | 209/5 |
| 4,088,732 | 5/1978 | Maynard et al. | 423/118 |
| 4,604,369 | 8/1986 | Shi | 423/118 |
| 4,916,094 | 4/1990 | Salinas | 501/146 |

Primary Examiner—Peter Hruskoci
Attorney, Agent, or Firm—Banner, Birch, McKie & Beckett

[57] ABSTRACT

The invention is directed to a method for reducing the viscosity and increasing the brightness of a kaolin clay by removal of mineral slimes having a particle size of less than about 0.2 micron. The process includes reflocculating an aqueous clay slurry by the addition of an overdose of dispersing agent. The reflocculated slurry is aged and dewatered by fractionation.

11 Claims, No Drawings

METHOD FOR REMOVING MINERAL SLIMES FROM KAOLIN CLAY

BACKGROUND OF THE INVENTION

1. Field of the Invention

The present invention relates to a method for reducing the viscosity of kaolin clays containing mineral slime impurities, and for increasing the brightness of these clays. More particularly, the present invention relates to a method for removing mineral slimes from a kaolin clay.

2. Description of Related Art

In many applications, the value of a kaolin clay depends both on its viscosity in aqueous slurries and on its color or brightness. Natural occurring kaolin clays can vary considerably in their color properties, even when produced from mines in the same locality or even from different sites in the same deposit. Discoloring contaminants found in natural occurring kaolin deposits often include titanium minerals and organic (carbonaceous) impurities. A clay otherwise suitable for a specific application may be rejected solely for its color.

U.S. Pat. No. 3,371,988 describes a process for removing highly colored titanium impurities from a kaolin clay by overdosing with a peptizing agent. The patent teaches dispersing kaolin clay slurry with the peptizing agent, such as sodium hexametaphosphate, in an amount of about twice that required to produce the minimum clay viscosity prior to classifying the clay. The colored titanium impurities then are separated as a sediment from the refined kaolin supernatant slurry.

U.S. Pat. No. 3,661,515 is directed to a method of brightening organically contaminated kaolin clays by oxidation. This method involves the procedure of chemically dispersing the clay into an aqueous slurry, using for example sodium hexametaphosphate, followed by degritting. After degritting, the slurry is treated with an oxidizing agent such as sodium hypochlorite followed by settling for a period of time which permits oxidation of organic contaminants and deposition of organic particles with larger clay particles. The supernatant kaolin clay slurry then is separated from the sediment containing the organic contaminants and the recovered slurry is flocculated, washed, filtered and dried by conventional methods.

There also are many kaolin deposits which cannot be used as a source of clay for many applications because of the relatively high level of certain mineral constituents, such as smectites (montmorillonite), present in the clay. These mineral constituents appear as very small or hyperfine particles in a slurry of the clay, and will be referred to herein as mineral slimes. The presence of a high level of mineral slimes in a kaolin may cause the clay to have an excessive viscosity in aqueous slurry and often contributes to its having an undesirable degree of color. High levels of mineral slimes also contribute to increased consumption of reagents during beneficiation and afterwards when such clays are employed in specific applications.

While attempts have been made to upgrade such marginal and submarginal kaolin by removal of mineral slimes, these attempts have not proved sufficiently successful for widespread commercial application. Often, these processes have achieved only limited removal of slimes, have not achieved a meaningful and reproducible reduction of the kaolin viscosity, and have failed to significantly increase the brightness of the kaolin. Thus, there remains a need in the art of kaolin beneficiation for a process which can successfully remove mineral slimes from a kaolin clay. Such a process would permit the utilization of marginal and submarginal quality kaolin clays which formerly have been of limited or no commercial value.

DISCLOSURE OF THE INVENTION

The present invention is directed broadly to a process for separating mineral slimes from a kaolin clay slurry. As used herein, mineral slimes comprise an extremely fine fraction of particles having a size of less than about 0.2 micron. The process comprises treating a kaolin clay slurry containing mineral slimes with a dispersing agent in an amount in excess of the amount required to obtain a minimum slurry viscosity, followed by recovering the kaolin clay fraction of the slurry by sedimentation from the supernatant slurry containing the fine particle fraction.

The present invention is based on the discovery that certain marginal and submarginal kaolin deposits, such as kaolin from Wood Mountain, Saskatchewan, Canada, in particular, can be readily beneficiated by subjecting the kaolin clay slurry to an overdose of a dispersing agent, i.e., an amount of dispersant beyond that necessary to obtain a minimum slurry viscosity. Such overdosing causes the mineral slimes of the slurry, i.e., the particles having a size less than about 0.2 microns, to remain in suspension, while the desired kaolin clay fraction of the slurry can be recovered separately from the mineral slimes by simple sedimentation, if desired.

According to one embodiment of the present invention, clay recovered from the mine is crushed and then slurried in order to produce a clay slip. This slip, also called a crude or slurry, then is degritted and classified to a desired clay particle size fraction by methods known to skilled practitioners, using for example hydroseparation, centrifugation, and the like, to form an aqueous kaolin clay slurry having a clay solids content of above about 5% (by weight) and preferably about 10 percent to about 30 percent based upon the weight of the dry clay. A clay solids content of about 20 percent has been found to provide superior results in the present method for reducing slimes.

Prior to this particle size classification, as is well-known, the clay slurry typically is treated with a dispersing agent in order to achieve a minimum slurry viscosity, i.e., a maximum dispersion of clay particles, to facilitate fractionation. These dispersing or deflocculating agents are well-known in the kaolin clay beneficiation art; suitable agents include polyphosphates, carbonates, silicates, inorganic alkalies in general and their basic salts, mixtures of these materials, and the like. The amounts of these reagents used in the original deflocculation of the clay slurry usually varies from about 0.5 pounds per ton of dry clay up to about 8 pounds per ton of dry clay, the exact amount depending on the clay itself and the type of dispersing agent used, as is well known.

It has long been known that the addition of increasing amounts of such dispersing agents to a clay slurry progressively reduces the slurry viscosity to a minimum value, beyond which continued additions cause the slurry viscosity to rise. For purposes of this invention, minimum slurry viscosity is defined for each clay-water-dispersant system as the minimum viscosity value measured at 60 weight percent slurry solids with a Brookfield viscometer at 10 r.p.m. (No. 1 spindle). Thus, in accordance with the present invention, the dispersant dose needed to effect a minimum slurry viscosity is determined at 60 percent solids for each slurry system without regard to the actual solids content at which the slurry is subsequently used in the process of this invention.

Refined clay of the desired particle size distribution recovered from the conventional classification or beneficiation treatment then typically is bleached with known chemical bleaching agents such as zinc or sodium hydrosulfite. Such bleaching normally increases the brightness of the classified clay from about 2 to about 5 points. The clay then generally is filtered and dried, and in normal cases the refined clay is ready for commercial use. Unfortunately, in the case of marginal and submarginal kaolin sources such treatment is not sufficient for producing a commercially acceptable kaolin clay. This is particularly the case with kaolin from Wood Mountain, Saskatchewan, Canada. The present invention provides a method for further upgrading such kaolin sources to provide a commercially acceptable kaolin product.

In the practice of the present invention, an aqueous clay slurry is reflocculated by the addition to the slurry of a quantity of dispersing agent greater than the quantity normally required to classify the clay and sufficient to create a stable reflocculated slurry. In this condition, it is possible to accomplish significant separation and sedimentation of the desired clay fraction from the remaining slurry fraction containing the undesired mineral slimes. Although a variety of kaolin clay slurries can be deslimed in accordance with this invention, including both crude clay slurries before initial classification and refined clay slurries after beneficiation and bleaching, it is preferred to deslime the clay after initial degritting but before other contaminants are separated from the clay. Removal of mineral slimes at this point significantly reduces the viscosity of the slurry, thus making the slurry easier to handle during subsequent processing. Subsequent reagent costs also are reduced by preliminary removal of the mineral slimes.

The quantity of dispersing agent utilized to reflocculate the clay slurry in accordance with the method of this invention depends upon the type and condition of clay being treated. Generally, an amount between just above the quantity required to obtain minimum viscosity and an additional 2.0 weight percent based on the weight of dry clay is utilized. Those skilled in the art recognize that greater quantities will be required as the specific surface area of the clay increases and as the quantity of mineral slime impurities in the clay increases. Preferably, between about 0.5 and 1.5 weight percent dispersant above that required to obtain minimum viscosity, based on the weight of the dry clay is utilized. Utilization of a quantity of dispersing agent larger than that required to achieve liberation of the slimes from the clay, although not injurious to the process of the present invention, is wasteful and increases operating costs. Not only is excess dispersant wasted, but also the dispersing agent subsequently must be removed from the clay slurry to obtain a slurry having minimum viscosity and facilitate subsequent handling.

Suitable dispersing agents include sodium hexametaphosphate (SHMP), tetrasodium pyrophosphate, sodium tripolyphosphate, sodium silicate, sodium polysilicate, or polyacrylates. These dispersing agents may be used in combination with ionic salts including sodium chloride, sodium sulfate, etc. For treatment in accordance with the present invention, the pH of the treated slurry may vary from between 6.5 to 12. A pH between 7 and 10.5 has been found to enhance the reflocculating characteristics of the kaolin clay. Higher pH generally increases product yield over that achieved at lower pH, but the improvement in product characteristics, such as viscosity and brightness, typically is not as great. The pH can be increased by adding sodium hydroxide, sodium carbonate, or similar basic materials, to the slurry.

Skilled practitioners recognize that the viscosity of a clay slurry tends to increase when the quantity of dispersing agent is increased beyond that quantity needed to achieve a minimum slurry viscosity. As more dispersing agent is added such slurries eventually gel. The point at which a gel forms depends upon not only the characteristics of the clay but also the pH of the slurry (gels typically form more readily at a higher pH), and identifying the point at which a gel forms is very subjective. The quantity of dispersing agent utilized in the method of the invention may actually lead to the formation of a gel or gel-like state in the clay slurry. However, this is not a concern since the method of this invention is effective without regard to whether a gel or gel-like state forms.

Thus-treated slurry is allowed to stand undisturbed typically for a period sufficient to allow a slime layer and at least one other distinct layer to form. A period of one-quarter hour to 6 hours typically is sufficient and an aging period of about one-half hour is adequate for most clays. The uppermost layer comprises the slimes, while the lower layer(s) comprise clay from which slimes have separated. A plurality of lower clay layers may form in those instances where the clay was not fractionated or was poorly fractionated before treatment according to the method of the present invention. Particles which are significantly larger than the average particle size will tend to form a layer at the bottom of the slurry, and may be separately recovered, either prior to dewatering (described below) or by classifying the kaolin in a subsequent step.

For best results, it is desirable to add a modifying agent to the treated clay slurry to facilitate the subsequent dewatering step and enhance the removal of the mineral slimes. The modifying agent acts as a mild flocculant and enhances the release of otherwise liberated slimes that are trapped in the voids of the reflocculated clay particles. The enhanced release of liberated slimes and mild reflocculation greatly improves the dewatering of the treated clay suspension, resulting in settled clay solids and centrifuged clay cakes of higher solids and lower residual slime content. A preferred modifying agent is common table salt, NaCl, in an amount of up to about 1.0 percent, preferably up to about 0.5 percent, based on dry weight of clay. Other inorganic or organic modifying agents, such as sodium sulfate, sodium bicarbonate, sodium borate, also may be used to achieve the same effect.

After the slimes have separated from the clay and formed what typically is a colored supernatant layer of particles, the slurry is dewatered to obtain settled clay solids or a clay cake having improved optical and rheological properties. The slurry is dewatered by any satisfactory method, such as centrifugation, filtration, and static sedimentation. The supernatant slime layer is recovered separately from the clay.

Centrifugation of the treated clay slurry at very high multiples of the force of gravity yields a clay cake having a high concentration of solids with a turbid liquid phase containing essentially all of the mineral slime on top. The clay cake may have a solids concentration as high as about 75 or 80 percent, and typically is useful in commerce at this condition. The clay cake conveniently is washed to remove salts.

A number of variations are available when filtration is utilized to dewater the treated clay slurry. For example, a filter medium may be selected so that the mineral slimes pass through the filter medium relatively easily while retaining the clay on the filter surface. Similarly, larger clay particles can be used as a pre-coat, or filtration aid, for the treated clay slurry, which then forms a cake thereon. Other modes of filtration will be apparent to the skilled practitioner. The solids concentration of a filtered cake typically is lower than that of centrifuged cake.

Static sedimentation, or gravity clarification, requires initial dilution of the clay slurry with water to a concentration of clay between about 3 and 5 weight percent (dry basis). Then, the slurry is dewatered be decantation in successive thickeners/clarifiers. The number of successive thickening and decantations operations or stages required depends upon the type of clay crude, the size and design of the thickener utilized and the desired slurry solids content.

If the clay slurry has gelled or has acquired gel-like properties, it may be necessary to subject the treated clay slurry to a plurality of centrifuge/wash cycles to "break" the gel and obtain a cake of the desired clay solids concentration having acceptable levels of salts, dispersing agents, and the like. The first centrifugation serves to compact the clay somewhat, but the presence of the dispersing agent prevents a high degree of compaction. Thus, at least some of the dispersing agent should be removed from the clay. Washing with aqueous sulfuric acid and alum typically is used to reduce the concentration of dispersant to about the concentration at which minimum viscosity is obtained. The slurry then is again centrifuged and rewashed until a clay cake of the desired solids concentration is obtained.

Additionally, enhanced results may be obtained with clay crudes by treating the treated clay suspension with sodium hypochlorite (NaOCl) or other oxidizing agents, such as ozone or sodium peroxide, in an amount, for example, of up to 0.5 percent based on dry weight of clay. The oxidizing agent serves to destroy some of the native organic contaminants present in the crude clay that may otherwise interfere with subsequent processing.

Both the kaolin clay fraction and the mineral slimes may be commercially important products. The slimes often are particularly suitable for calcined products and in specialty pigments.

Removal of the mineral slime fraction by the method of the present invention causes a reduction in the viscosity of the clay slurry and a reduction in the specific surface area of the clay fraction. Typically, an increase in brightness of from to 2 to 10 points in the kaolin fraction also occurs. Therefore, many marginal and submarginal kaolin clays can be treated in accordance with the present invention and subsequently used in applications for which they were not previously suitable. Typically, such clays have a slime fraction, i.e., weight percent particles less than about 0.2 microns, of about 10 weight percent, more typically about 20 weight percent, and can range up to about 50 weight percent or more. Further, clays which have been degritted, classified according to size, and are commercially available "bright" clays, also can be improved by being treated in accordance with the method of the invention. Such commercially available clays typically have a slime fraction, as described above, of about 5 weight percent, often as high as about 20 percent. As described above, the beneficiated kaolin cake also may be further beneficiated by methods such as magnetic separation and leaching.

The process is illustrated by the following non-limiting examples.

EXAMPLES

The following Examples describe the beneficiation and fractionation of crude kaolin clays. The crude clay was dispersed with a dispersant in a slurry to about its minimum slurry viscosity, then was degritted by screening on a 325 mesh sieve. The oversized sand was discarded. The degritted slurry then was fractionated to obtain a +5 micron fraction (i.e. particle sizes greater than 5 microns) and a −5 micron fraction (i.e. particle sizes less than 5 microns), which were maintained in slurry form.

In each example, the −5 micron fraction slurry then was treated with an additional quantity of dispersant as-noted and, in some cases, with other adjuvants to aid the separation of the mineral slimes from the clay. This −5 micron fraction slurry was sub-divided into multiple portions where more than one treatment is described below. Thus-treated slurry was allowed to stand undisturbed for 30 minutes, after which the treated and aged slurry was centrifuged for about 20 minutes at from about 2400 to 3000 times the force of gravity (G's). A colored slime slurry fraction was decanted from the centrifuge and a kaolin clay cake was separately recovered.

Throughout the Examples, brightness was measured in accordance with TAPPI procedure 649 OS-75 on a brightness-determining instrument manufactured by General Electric Company ("GE brightness"). Viscosity was measured with a Brookfield viscometer in accordance with TAPPI procedure 648 SU-72, and particle size distribution was determined on a Micromeritics-brand sedigraph in a manner known to those skilled in the art.

EXAMPLE 1A

A crude kaolin clay containing about 60 percent fine sand was dispersed with sodium hexametaphosphate (SHMP) in an amount of 0.25 percent based on dry weight of clay. The slurry, which after treatment had a pH of 7.0 to 7.5, was degritted, yielding a slurry having a solids content of about a 20 percent by weight and a GE brightness of about 67.7. The slurry was fractioned and the resulting −5 micron fraction had a GE brightness of 69.3.

The −5 micron fraction slurry had a mean particle size of about 0.8 microns, with about 19 weight percent less than 0.2 microns. A portion of this slurry then was treated with additional SHMP in an amount of 0.35 weight percent, the pH of the treat slurry was adjusted to 8.5 with NaOH and the clay was beneficiated by centrifugation.

The beneficiated (centrifuged) kaolin clay cake had a mean particle size of 1.0 microns, with substantially no particles less than 0.2 microns. The cake also had a brightness of 71.7. The yield of beneficiated clay was 80 weight percent of the degritted crude slurry, with the other 20 weight percent recovered as a slime fraction. After magnetic separation and leaching, the brightness of the treated kaolin fraction was increased further to within the 80-82 range.

This Example illustrates a substantially total removal of the portion of clay minerals smaller than 0.2 microns from the −5 micron clay slurry and the improved product characteristics which result therefrom.

EXAMPLE 1B

A portion of the −5 micron fraction of the clay slurry described in Example 1A was treated with SHMP in an amount of 1 percent and 0.5 percent NaOCl, instead of with only the 0.35 percent SHMP, and beneficiated by centrifugation.

The resulting clay solids had a mean particle size of about 1.2 microns, with only about 8 percent less than 0.2 microns. The brightness of the dried clay cake was 73.1, and the yield was 86.1 weight percent based on the weight of degritted crude clay. The clay had a specific surface area of 22.0 m²/g.

This Example illustrates the enhanced brightness of a clay further treated with sodium hypochlorite.

EXAMPLE 2

The above-described beneficiation process was repeated on a different crude clay which was dispersed with 0.2 weight percent of SHMP at a pH of 7.0, degritted, and fractioned. The −5 micron fraction of this clay had a brightness of 63.7, and a specific surface area of 33.2 m²/g. This slurry was mixed with additional SHMP in an amount of 0.5 weight percent and with 0.5 weight percent NaCl and the pH of the treated slurry was adjusted to 8.5. The slurry was stored undisturbed overnight and centrifuged to yield a kaolin cake having a specific surface area of 28.1 m²/g, and a brightness of 71.0.

The mean particle size of the −5 micron fraction of the degritted and fractioned clay was about 1.0 micron, with about 26 weight percent less than 0.2 micron. Upon centrifugation, 85.9 weight percent of the solids treated were recovered as kaolin clay. Deslimed clay slurry had a mean particle size of 0.8 microns, with only about 14 weight percent less than 0.2 microns. The slime fraction was 90 weight percent less than 0.25 microns, with 77 weight percent less than 0.2 microns.

EXAMPLES 3-15

Table 1 presents dosing information for a variety of clays beneficiated in accordance with the present invention; while Table 2 present specific surface area and brightness data for the variety of clays before and after such treatment.

TABLE 1

| Example No. | Clay Type (Source) | SHMP (wt %) | NaOCl (wt %) | NaCl (wt %) |
|---|---|---|---|---|
| 3 | Fire Clay | 1.0 | — | — |
| 4 | Fire Clay | 1.0 | 0.5 | — |
| 5 | — | 0.5 | 0 | 0.5 |
| 6 | Plastic Clay | 0.35 | — | 0.5 |
| 7 | Plastic Clay | 0.35 | — | — |
| 8 | Ball Clay | 0.5 | — | — |
| 9 | Ball Clay | 0.5 | 0.5 | — |
| 10 | Ball Clay | 1.0 | — | — |
| 11 | Ball Clay | 1.0 | 1.0 | — |
| 12 | Organic Clay | 1.0 | — | — |
| 13 | Organic Clay | 1.0 | 1.0 | — |
| 14 | Ball Clay | 1.0 | — | — |
| 15 | Ball Clay | 1.0 | 1.0 | — |

TABLE 2

| | Pretreated Minus 5 Microns Fraction | | Post-Treated Deslimed Clay Fraction | |
|---|---|---|---|---|
| Example No. | Specific Surface Area m²/g | Brightness | Specific Surface Area m²/g | Brightness |
| 3 | 44.7 | 56.5 | 32.8 | 65.1 |
| 4 | 44.7 | 56.5 | 40.6 | 67.3 |
| 5 | 33.1 | 70.8 | 27.1 | 72.6 |
| 6 | 30.5 | 70.2 | 28.6 | 73.6 |
| 7 | 30.0 | 66.3 | 25.9 | 70.2 |
| 8 | 57.9 | 37.1 | 45.4 | 55.5 |
| 9 | 57.9 | 37.1 | 47.0 | 58.6 |
| 10 | 25.3 | 55.3 | 16.0 | 66.8 |
| 11 | 25.3 | 55.3 | 21.3 | 70.9 |
| 12 | 21.6 | 28.9 | 14.9 | 47.4 |
| 13 | 21.6 | 28.9 | 11.9 | 42.8 |
| 14 | 22.9 | 54.7 | 11.4 | 63.4 |
| 15 | 22.9 | 54.7 | 13.8 | 70.1 |

EXAMPLES 16-19

Examples 16-19 illustrate the improvements which result when commercially-available products are treated in accordance with (i) the method of the invention; (ii) the method of U.S. Pat. No. 3,371,988, and (iii) a combination of the method of U.S. Pat. No. 3,371,988 followed by the method of the present invention. The following products were treated:

Example 16 Huber Hydragloss ®
Example 17 Englehard Ultragloss 90 ®
Example 18 Georgia Kaolin Astraglaze ®
Example 19 Nord Norcote II ®

EXAMPLE 16

| Sample | pH | Minimum Viscosity, cp (% Solids) | Specific Surface Area, m²/g | Mean Particle Size, microns | % less than 0.2 microns | Brightness |
|---|---|---|---|---|---|---|
| As supplied | — | 580(69.6) | 21.9 | 0.25 | 30 (Approx) | 86.9 |
| Treated in accordance with U.S. 3,371,988 | | | | | | 89.8 |
| Deslimed Clay | 8.5 | | 18.1 | 0.29 | 23 | 87.9 |
| Treated (U.S. 3,371,988), then deslimed | — | 323(70.0) | — | — | — | 91.1 |

Quantity and Identity of Agents used in Desliming: 1.0 weight percent SHMP

EXAMPLE 17

| Sample | pH | Minimum Viscosity, cp (% Solids) | Brightness |
|---|---|---|---|
| As supplied |  | 380(69.9) | 89.2 |
| Deslimed Clay | 8.5 | 250(70.0) | 90.5 |

Quantity and Identity of Agents used in Desliming: 1.0 weight percent SHMP

EXAMPLE 18

| Sample | Minimum Viscosity, cp (% Solids) | Brightness |
|---|---|---|
| As supplied | 400(69.5) | 86.5 |
| Deslimed Clay | 265(70.0) | 87.2 |

Quantity and Identity of Agents used in Desliming: 1.0 weight percent SHMP

EXAMPLE 16

| Sample | Minimum Viscosity, cp (% Solids) | Mean Particle Size, microns | % less than 0.2 microns | Brightness |
|---|---|---|---|---|
| As supplied | 480(70.0) | 0.35 | 26 | 83.9 |
| Treated in accordance with U.S. 3,371,988 |  |  |  | 87.3 |
| Deslimed Clay |  | 0.40 | 19 | 85.2 |
| Treated (U.S. 3,371,988), then deslimed | 233(70.0) |  |  | 88.0 |

Quantity and Identity of Agents used in Desliming: 1.0 weight percent SHMP

While certain specific embodiments of the invention have been described with particularity herein, it will be recognized that various modifications thereof will occur to those skilled in the art.

We claim:

1. A process for beneficiating a kaolin clay slurry containing mineral slimes, said mineral slimes having a particle size of less than 0.2 micron, comprising:
   treating said kaolin clay slurry at a pH of between about 6.5 and 12 with a dispersing agent in an amount in excess of the amount required to obtain a minimum slurry viscosity,
   separating by sedimentation from said mineral slimes a beneficiated kaolin clay having a reduced viscosity and increased brightness and
   removing from said beneficiated kaolin clay a supernatant slurry containing the mineral slimes.

2. The process of claim 1 wherein said sedimentation is accomplished by centrifugation.

3. The process of claim 1 wherein said sedimentation is accomplished by diluting the treated slurry followed by dewatering in successive thickeners/clarifiers.

4. The process of claim 1 wherein said dispersing agent is selected from the group consisting of sodium hexametaphosphate, tetrasodium pyrophosphate, sodium silicate, sodium polysilicate and polyacrylates.

5. The process of claim 1 wherein said dispersing agent is combined with an ionic salt.

6. The process of claim 1 wherein said kaolin clay slurry has a solid content of between about 10 percent and 30 percent based upon dry weight of clay.

7. The process of claim 1 wherein said amount of dispersing agent is between about 0.35 percent to 1.0 weight percent based on dry weight of clay.

8. The process of claim 1 wherein said treated clay slurry is stored for about 30 minutes to 6 hours prior to said separating.

9. The process of claim 1 further including the step of adding a modifying agent to the treated clay slurry to facilitate dewatering.

10. The process of claim 9 wherein said modifying agent is sodium chloride in an amount of up to 0.5 percent based on dry weight of clay.

11. The process of claim 1 wherein said treated clay slurry is treated with an oxidizing agent in an amount of up to 0.5 percent based on dry weight of clay.

* * * * *